(12) United States Patent
Kou

(10) Patent No.: US 7,798,912 B2
(45) Date of Patent: Sep. 21, 2010

(54) VARIABLE HARDNESS HAND GRIP

(75) Inventor: Chiang Chung Kou, Guan Miao (TW)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 11/901,349

(22) Filed: Sep. 17, 2007

(65) Prior Publication Data
US 2009/0075747 A1   Mar. 19, 2009

(51) Int. Cl.
*A63B 53/14* (2006.01)
(52) U.S. Cl. .................................... 473/300
(58) Field of Classification Search .......... 473/300–303
See application file for complete search history.

(56) References Cited

U.S. PATENT DOCUMENTS

| | | | |
|---|---|---|---|
| 1,210,182 A | 12/1916 | Lynch | |
| 1,831,255 A | 11/1931 | Menzies | |
| 2,992,828 A | 6/1956 | Stewart | 273/80 |
| 3,606,327 A | 9/1971 | Gordon | 273/81 A |
| 4,203,598 A | 5/1980 | Stuff et al. | 273/77 |
| 4,674,746 A | 6/1987 | Benoit | 273/81 |
| 4,936,586 A | 6/1990 | Van Raemdonck | 273/73 |
| 5,145,171 A | 9/1992 | Head et al. | 473/300 |
| 5,152,527 A | 10/1992 | Mather et al. | 273/77 |
| 5,322,290 A | 6/1994 | Minami | 473/201 |
| 5,330,193 A | 7/1994 | Ijiri | 273/193 |
| 5,362,046 A | 11/1994 | Sims | 273/73 |
| 5,465,967 A | 11/1995 | Boeckenhaupt | 273/162 |
| 5,540,625 A | 7/1996 | Koch et al. | 473/318 |
| 5,560,578 A * | 10/1996 | Schenken et al. | 248/313 |
| 5,735,752 A | 4/1998 | Antonious | 473/317 |
| 5,766,088 A | 6/1998 | Severtsen | 473/297 |
| 5,842,933 A | 12/1998 | Lewis | 473/300 |
| 5,851,632 A | 12/1998 | Chen et al. | 428/156 |
| 5,855,525 A | 1/1999 | Turner | 473/300 |
| 6,354,958 B1 | 3/2002 | Meyer | 473/297 |
| 6,506,128 B1 | 1/2003 | Bloom, Jr. | 473/292 |
| 6,626,768 B2 | 9/2003 | Roelke | 473/296 |
| 6,656,054 B2 | 12/2003 | Ulrich | 473/201 |
| 6,843,732 B1 * | 1/2005 | Huang | 473/300 |
| D502,750 S | 3/2005 | Chen | D21/756 |
| RE38,983 E | 2/2006 | Antonious | 473/317 |
| 7,008,582 B2 * | 3/2006 | Chen | 264/132 |
| 7,048,644 B2 | 5/2006 | Wang | 473/300 |
| 7,088,582 B2 | 8/2006 | Chen | 264/132 |
| 7,097,797 B2 | 8/2006 | Chen | 264/132 |

(Continued)

FOREIGN PATENT DOCUMENTS

CN    1332022 A    1/2002

(Continued)

OTHER PUBLICATIONS

U.S. Appl. No. 11/655,462, filed Jan. 19, 2007.

(Continued)

*Primary Examiner*—Stephen L. Blau
(74) *Attorney, Agent, or Firm*—Daniel S. Kalka

(57) ABSTRACT

The present disclosure relates to a multicompound weight balanced hand grip for an implement, like a golf club grip, that has varying hardness and specific gravities in selected sections of the grip for providing an adjustable fulcrum position for the grip.

9 Claims, 5 Drawing Sheets

U.S. PATENT DOCUMENTS

| | | | |
|---|---|---|---|
| D530,762 S | 10/2006 | Chen | D21/756 |
| D536,048 S | 1/2007 | Chen | D21/756 |
| 7,160,202 B2 * | 1/2007 | Chen | 473/300 |
| 7,264,759 B2 | 9/2007 | Lamkin | 264/248 |
| 7,404,770 B2 | 7/2008 | Huang | 473/300 |
| 7,458,903 B2 * | 12/2008 | Wang et al. | 473/300 |
| 2002/0173371 A1 | 11/2002 | Lamkin et al. | |
| 2003/0157990 A1 | 8/2003 | Bloom, Jr. | |
| 2004/0248664 A1 * | 12/2004 | Billings | 473/300 |
| 2005/0164804 A1 * | 7/2005 | Poynor | 473/314 |
| 2005/0221909 A1 * | 10/2005 | Nam | 473/300 |
| 2007/0032309 A1 | 2/2007 | Chang | |
| 2007/0072696 A1 * | 3/2007 | Chen | 473/300 |
| 2008/0125238 A1 | 5/2008 | Chen | 473/300 |

FOREIGN PATENT DOCUMENTS

| | | |
|---|---|---|
| EP | 0 227 347 B1 | 7/1987 |
| GB | 2 315 418 A | 4/1998 |
| WO | WO 03-066173 A1 | 8/2003 |

OTHER PUBLICATIONS

U.S. Appl. No. 11/724,062, filed Mar. 14, 2007.
U.S. Appl. No. 11/619,739, filed Jan. 4, 2007.
U.S. Appl. No. 11/607,707, filed Dec. 1, 2006.
U.S. Appl. No. 11/449,108, filed Jun. 8, 2006.
U.S. Appl. No. 11/619,744, filed Jan. 4, 2007.

* cited by examiner

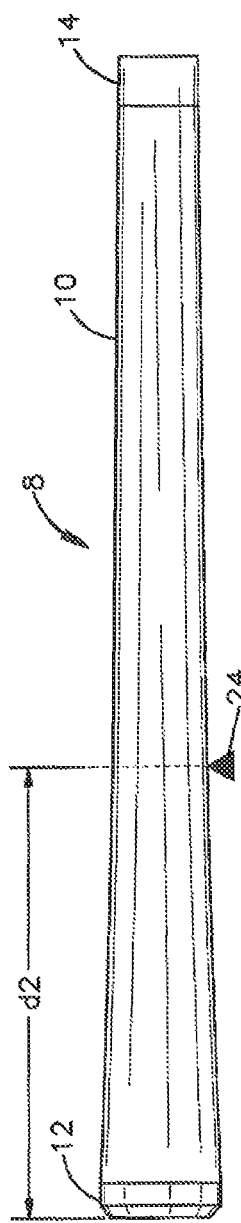
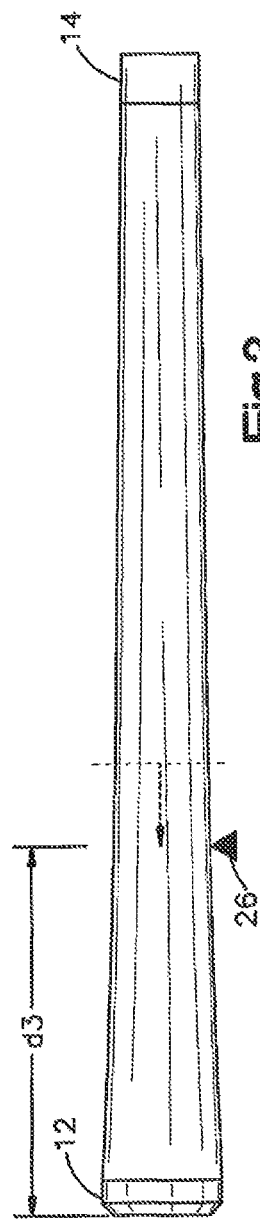
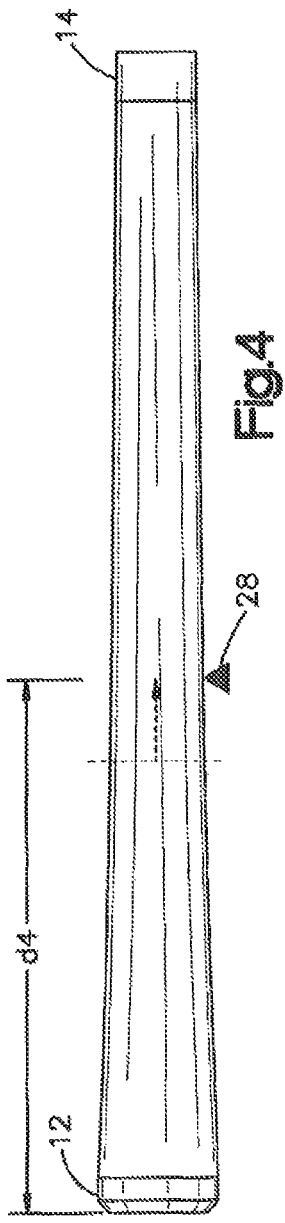

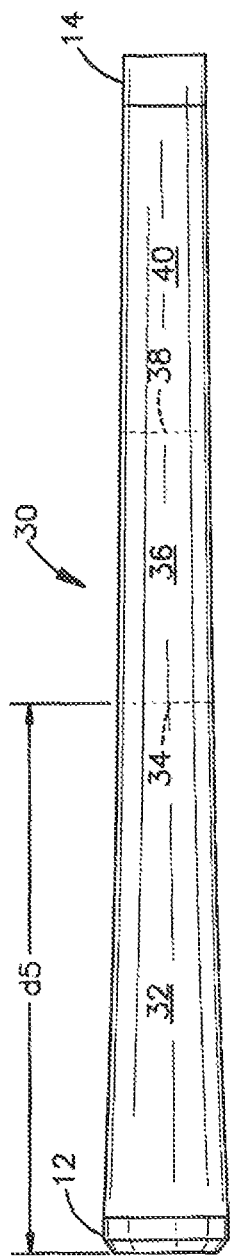
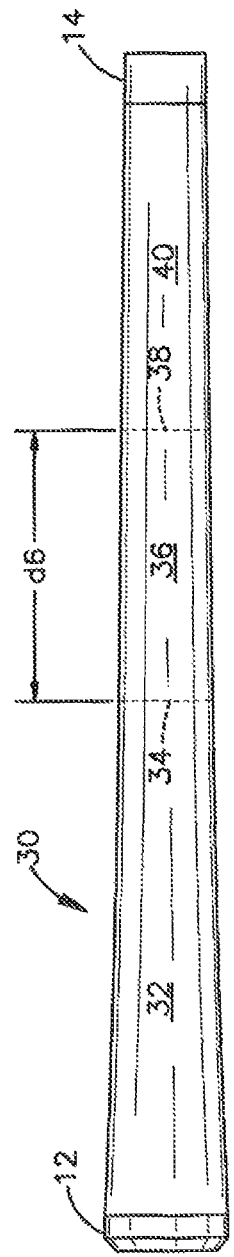
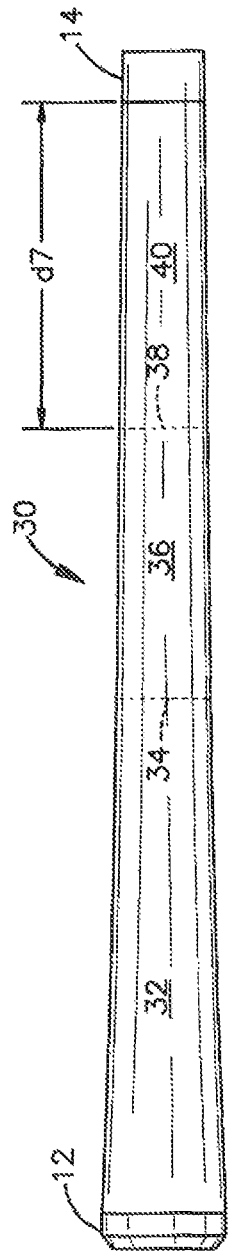

_US 7,798,912 B2_

VARIABLE HARDNESS HAND GRIP

FIELD

The present disclosure relates generally to grips and, more particularly, to hand grips for sporting implements.

BACKGROUND

There are many different types of grips used today for a wide variety of items, including without limitation, golf clubs, tools (hammer handles, screwdrivers, etc.), racquets (racquet ball, squash, badminton, or tennis racquets), bats (baseball or softball), pool cues, umbrellas, fishing rods, etc. While particular reference for this disclosure is being made for the application to golf club grips, it should be immediately apparent that the present disclosure is applicable to other grips as well.

Slip-on golf club grips made of a molded rubber material or synthetic polymeric materials are well known and widely used in the golf industry. The term "slip-on" as employed herein refers to a grip that slides on to a shaft or handle and is secured by way of an adhesive, tape, or the like. Slip-on grips are available in many designs, shapes, and forms.

Golf club grips historically have been made of a wide variety of materials such as leather wrapped directly on the handle or leather wrapped on sleeves or underlistings that are slipped on to the handle, or more recently rubber, polyurethane or other synthetic elastomeric materials are used. Efforts are constantly being made to improve the gripping quality of the grip without sacrificing the torsional resistance of the grip on the handle or club. Currently, there is great interest in the so-called dual durometer grips which are grips that apply two layers of different materials with varying hardness to provide a grip that has good grip feel and still provides good swing performance.

While these dual durometer grips do provide good grip feel over the length of the grip, there are times when the user would like to be more selective on the structure of the grip and the locations of changes in the hardness and the structure of the grip.

Thus, there still exists a need for a hand grip that provides a variable hardness range over the grip with indicators to allow the user to easily identify those locations of the changes in hardness and the center of balance position of the grip for maximizing the responsiveness and effectiveness when swinging the implement with the grip.

BRIEF SUMMARY OF THE DISCLOSURE

The present disclosure relates to a hand grip formed from materials to provide a varying hardness and specific gravity sections in selected sections of the grip with these sections having indicators to allow the user to easily identify the desired grasp zone of the grip.

A more particular aspect of the present disclosure is directed to a golf club grip which is an elongated tubular body having a hollow core constructed to slip on to a golf club shaft. The body of the golf grip has a butt end at an upper end and opposite the butt end a tip end which receives the golf club shaft. In selective regions of the body, there are at least three sections or zones of varying hardness values and specific gravities. These three sections include an upper section, a middle section, and a bottom section with each of the sections having a selected hardness and specific gravity with an indicator, typically a color variation, for identifying each section for facilitating hand placement.

The various features of novelty which characterize the present disclosure are pointed out with particularity in the claims annexed to and forming a part of this disclosure. For a better understanding of the instant disclosure, its operating advantages, and specific objects attained by its uses, reference is made to the accompanying drawings, and descriptive matter in which preferred embodiments are illustrated.

BRIEF DESCRIPTION OF THE DRAWINGS

FIG. 2 is a schematic frontal view of a golf club grip indicating a typical position for the center of balance position of the grip.

FIG. 3 is a view similar to FIG. 2 showing the center of balance position moved to the left or towards the butt end of the grip.

FIG. 4 is a view similar to FIGS. 2 and 3 showing the center of balance position moved to the right or towards the tip end of the grip.

FIG. 5 is a schematic frontal view of a grip made in accordance with the disclosure.

FIG. 6 is a schematic frontal view similar to FIG. 5.

FIG. 7 is a schematic frontal view similar to FIGS. 5 and 6.

DETAILED DESCRIPTION

The present disclosure is described with reference to the accompanying drawings with preferred embodiments illustrated and described. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Like numbers refer to like elements throughout the disclosure and the drawings. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

Even though the embodiments of this disclosure are particularly suited as golf club grips and reference is made specifically thereto, it should be immediately apparent that embodiments of the present disclosure are applicable to other grips for implements.

Figure 1:
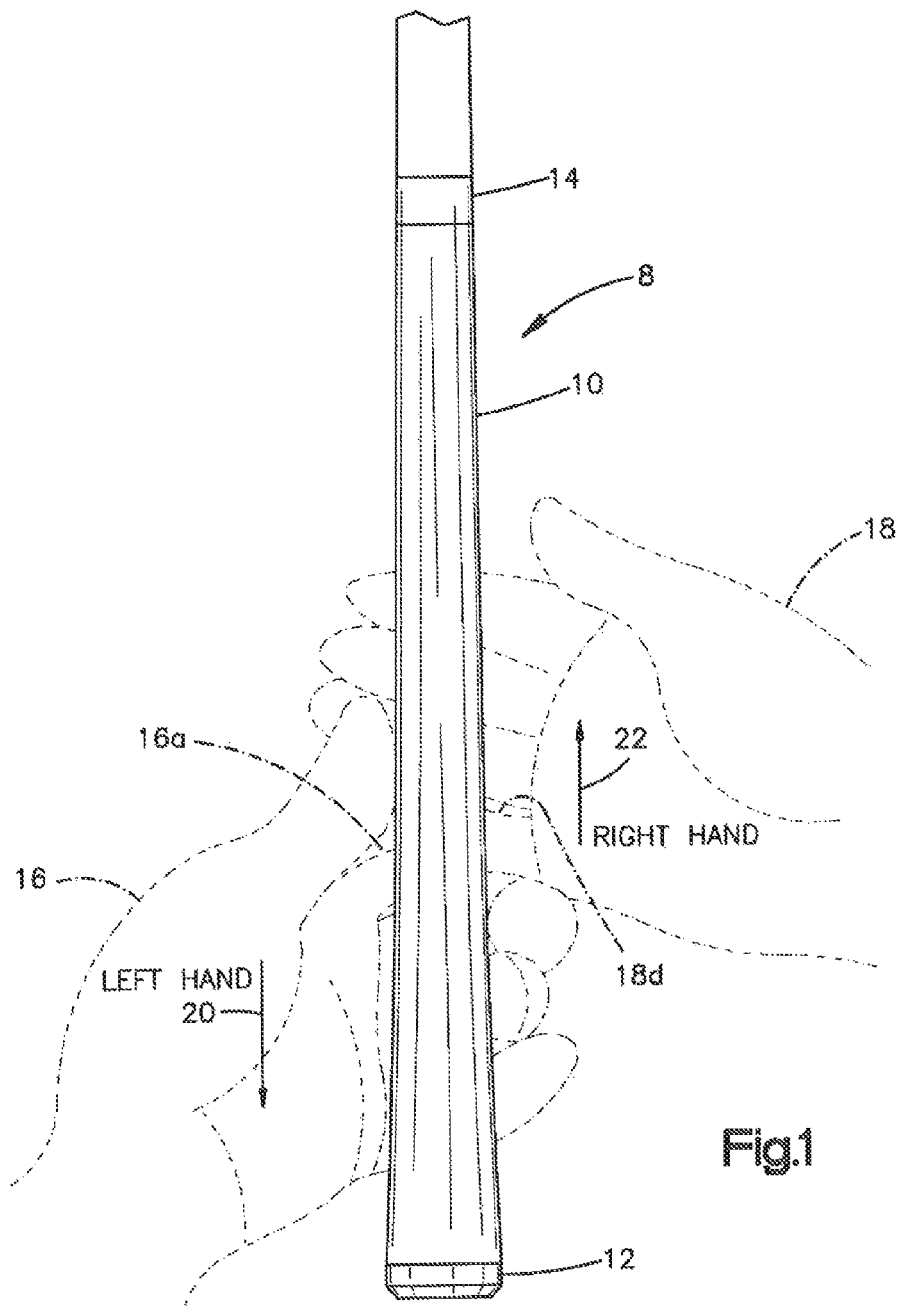
FIG. 1 is a schematic frontal view of a golf club grip positioned within the open hands of a golfer.

Referring first to FIG. 1, there is shown a golf club grip 8 situated in the open hands of a right-handed golfer. The term "right-handed" as employed herein is intended to mean someone who uses their right hand as their primary or dominant hand of choice in activities which include but are not limited to the hand they use for throwing a ball, writing, swinging a racket, a bat, or a golf club. The term "left-handed" as used herein would mean the opposite hand in these types of activities. The golf club grip 8 has a structure which includes an elastomeric hollow tubular body 10 with a butt end 12 and a tip end 14. An open left hand 16 of a golfer is positioned towards the butt end 12 of the grip 8, and an open right hand 18 is positioned towards the tip or open end 14 of the grip 8. As is known and optional to golfers, a couple of fingers (the smallest finger 18 *d* on the right hand 18 interlocks with the first finger 16 *a* or forefinger on the left hand 16) may interlock when forming the closed grip on the golf club. In addition, the hands 16, 18 may rotate slightly circumferentially or axially on the grip for the "three knuckle power or strong position" as described in U.S. Pat. No. 6,656,054. Arrow 20 on the left hand 16 indicates the direction towards the butt end of the grip 8 the left hand 16 can move axially on the grip 8 when feeling or searching for the optimum or proper position with respect to the golfer for hand 16 on the grip 8. Similarly, arrow 22 indicates the direction towards tip end 14 of the grip the right hand 18 can move axially on the grip 8 when searching for the optimum or proper position for hand 18 for the golfer. Of course, each individual and the best hand position will vary with the golfer based on these and on a wide variety of golfing conditions such as weather and the golf course. Other factors include but are not limited to grip feel, golf club, shaft composition, weight of the club head, and even the size of the hands of the golfer. Naturally, for a left-handed person the placement of the hands 16, 18 would be opposite that of a right-handed person. Hand placement on a golf grip is an important factor in a golf swing. Hand placement can influence the distance and direction of the flight of the golf ball. Equally important is being able to place the hands on the grip at or near the center of balance or fulcrum position of the grip. It is desirable to be able to quickly find the center of balance position or the fulcrum position of the grip. The term "fulcrum" position as used herein is meant to include but not limited to the center of balance of the grip or the pivot point of the grip. The present disclosure has an innovative design for an adjustable fulcrum position defined by calculating the volume of each section of a grip and the specific gravity of the section. A higher specific gravity of an upper section which makes it heavier will move the fulcrum towards the butt end of the grip, and vice versa. Indicators are valuable guides for the golfer to easily locate the fulcrum position. These indicators according to the subject disclosure will be more fully described herein later. Another important factor in the golf swing is the ability to have proper grip feel. The grip should provide the user with the desired hardness or softness of the grip in those locations or recognize those locations by feel on the grip most comfortable for the user. The subject disclosure provides the user the ability to visually recognize those locations to quickly select the hand placement for the grip feel that is the most comfortable to the golfer and the center of balance of the grip. The center of balance of a golf club is extremely important in maintaining swing control and thus ball flight and accuracy. As the grip is the source of a majority of the mass in the upper shaft end of a golf club, it is only natural to utilize that part of the club to provide a variable aspect of the club balance overall. By providing grips with controlled variable range of "butt weighting" or more specifically weight balancing of the grip, the club can be tailored to provide an optimized and fully balanced system. The grip as described in the present disclosure allows for flexibility in the design of the grip structure according to a customer's request as will be more fully described herein.

FIG. 2 shows a golf grip 8 of a standard size and dimensions with the location of a typical center of balance indicated by arrow point 24 with a dashed line extending across the grip as a marker. If one were to actually measure the distance (d2) from the butt end 12 of the grip 8 to the center of balance position 24, it would be in the range of approximately 3 to approximately 4 inches. The present disclosure has found a way to selectively move the center of balance position 24 to either a new left center of balance position 26 closer to the butt end 12 shown in FIG. 3 with the distance from the butt end 12 indicated as (d3) with the dashed line showing the previous center of balance and the dashed arrow indicating the movement to the left, or alternatively to the new right center of balance position 28 shown in FIG. 4 with the distance from the butt end 12 designated (d4) with the dashed line in FIG. 4 showing the previous center of balance, and the dashed arrow in FIG. 4 indicating the displacement to the right. The left balance position 26 can range from approximately 2 to approximately 3 inches from the butt end 12 of the grip which is the distance d3. The right balance position 28 can range from approximately 4 to approximately 5 inches from the butt end 12 of the grip which is the distance d4.

In order to shift the center of balance 24 to the left center of balance position 26 on grip 30 according to the present disclosure, an upper region, section, or zone 32 of the grip 30, as best seen in FIG. 5, is made from an elastomeric material with a high specific gravity ranging from approximately 0.8 to approximately 2.0 and a durometer value ranging from approximately 40 to approximately 60 Shore A. A durometer value or rating is an international standard for the hardness measurement of rubber, plastic and other non-metallic materials. Durometers are described in the American Society for Testing and Material specification ASTM D2240. Section 32 extends from one edge of the butt end 12 of grip 30 an approximate distance (d5) which can range from approximately 2 inches to approximately 5 inches from cap 12 towards the tip end 14. Dashed line 34 represents the approximate boundary for section 32. While this dashed line 34 is shown as a straight line as a boundary line which does traverse circumferentially around the grip 30, it should be immediately apparent that the dashed line 34 marking off section 32 does not necessarily have to be a straight line, it can be a curved line or a wavy line, or fashioned to correspond with selected fingers on a golfer's hand. In one of the preferred embodiments dashed line 34 does curve towards the tip end 14 on the front side of the grip, but then curves towards the butt end 12. The upper section 32, as can the other sections, vary in surface area and/or volume or depth of material making up this region. The entire tubular portion of section 32 in one embodiment making up the grip 30 is preferably made from the material with a high specific gravity. The specific gravity of the material is preferably approximately 1.08 in section 32, but can range from approximately 0.8 to approximately 2.0, and more preferably from approximately 0.96 to approximately 2.0. Upper section 32 is selectively designated its own identifying color or color tone, which may be any color including black. When desired or requested, a corded material may be used for more positive gripping for upper section 32.

Immediately adjacent the upper section 32 is the middle region, section, or zone 36 on the grip 30. The middle section 36 employs an elastomeric material with a different specific gravity value and durometer value from the elastomeric material used for the upper section 32. The material employed for the middle section 36 has a durometer value ranging from approximately 40 to approximately 60 Shore A on the hardness scale, or more preferably from approximately 40 to approximately 55 Shore A. The specific gravity of the material used here can range from approximately 0.6 to as high as approximately 1.0, and more preferably from approximately 0.65 to approximately 0.95. The middle section 36 as seen in FIG. 6 extends for an approximate distance (d6) of approximately 2.0 inches between dashed boundary lines 34, 38. As mentioned previously with respect to dashed line 34, the same holds true for dashed line 38, that is, even though it is depicted as a straight line circumferentially extending around the grip 30, line 38 may be curved in either direction or a wavy line.

The bottom or lower section or zone 40 is adjacent the middle section 36 and extends a distance (d7) approximately 2 to approximately 5 inches from dashed line 38 to the tip end 18 as seen in FIG. 7. The bottom section preferably is made from a material having a durometer value ranging from approximately 40 to approximately 60 Shore A, or more preferably approximately 40 to approximately 55 Shore A. The bottom section is made of a material with a specific gravity ranging from approximately 0.6 to as high as approximately 1.0, or more preferably 0.65 to approximately 0.95.

For illustrative purposes to better understand the subject disclosure, a typical golf club grip weighs approximately 48 grams (g) and has an approximate length of 272 millimeters (mm). It has a specific gravity of approximately 1.02 with a durometer value of approximately 48 Shore A. The fulcrum position 24 measured from the butt end 12, as seen in FIG. 2 as distance (d2), is approximately 96 mm. A weight balanced grip requesting the fulcrum 26, as seen in FIG. 3, still has an approximate weight of 48 g. and an approximate length of 272 mm. Upper or top section 32 has a specific gravity of approximately 1.08 with an approximate durometer value of 48 Shore A. The middle section 36 has a specific gravity of approximately 0.87 and a durometer value of approximately 43 Shore A. The bottom section 40 has a specific gravity of approximately 43 Shore A. In this weight balance grip the fulcrum position 26 is located at approximately 88 mm from the butt end 12 or distance (d3) as seen in FIG. 3.

When these three sections 32, 36, and 40 are made of materials having the durometer values and specific gravities as described, the center of balance or fulcrum position is shifted to the left as illustrated in FIG. 3 and previously described with the illustrative example. Advantageously, the present disclosure may also shift the center of balance of position to the right by varying the specific gravity as illustrated in FIG. 4 at the user or customer's request. To shift the center of balance position to the right as depicted in FIG. 4, the material with the high specific gravity is employed for the bottom section 40 rather than the upper section 32.

Additional illustrative examples are provided in the tables below where specific gravity is abbreviated as "spg" and the molding process is described as either "compression" molding or "injection" molding. To make a grip with a fulcrum position close to bottom section 40 (Case 1), the design is as below.

| Grips | Process | Top | Middle | Bottom | Fulcrum |
| --- | --- | --- | --- | --- | --- |
| Case 1 | compression | spg 0.75 | spg 0.75 | spg 1.50 | Move towards bottom section 40 |
| Case 2 | compression | spg 1.50 | spg 0.75 | spg 0.75 | Move towards top section 32 |
| Regular | injection | | spg 1.50 | | Regular position 24 |

For each section, compound properties, specific gravity, hardness, feeling, color are adjustable characteristics while making the design.

The available spg allocation matrix includes but are not limited to those shown below (H: high spg; L: low spg):

| Top | Middle | Bottom |
| --- | --- | --- |
| H | L | L |
| L | L | H |
| H | H | L |
| L | H | H |

In this manner, the grip according to the present disclosure can be custom designed to shift the center of balance position in either direction on the grip to fit a golfer's request.

Advantageously, the sections of the grip 30 are color coded as visual indicators for the golfer to note where the different materials are on the grip 30. These color indicators may be simply varying shades of a single color, or alternatively different colors or color patterns and color arrangements. The indicators of the upper, middle, and bottom sections may also have patterns (indentations, outer surface ridges, or raised portions, or other surface textures) that are recognizable by simply feeling the grip which are referred to herein as "feel indicators" as opposed to the "visual indicators" previously mentioned. While this disclosure depicts three distinct sections on the grip 30, it should be immediately apparent that more than three distinct sections may be employed in the grip.

Figure 9:
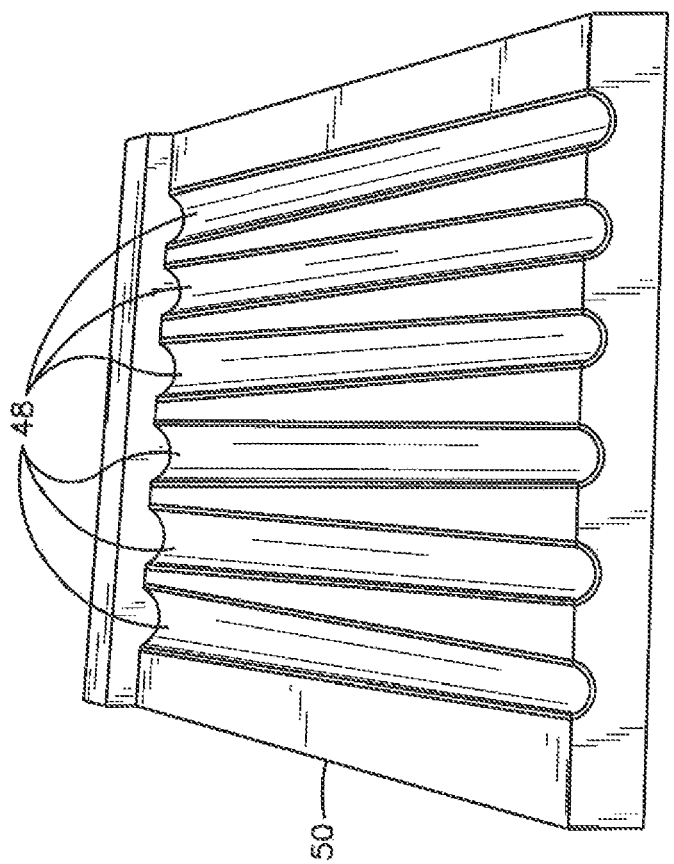
FIG. 9 is an elevated view of one-half of a compression mold used in making the grip according to the present disclosure.
Figure 8:
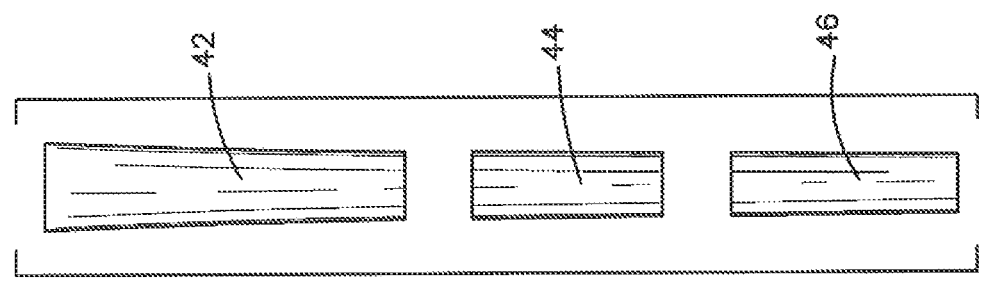
FIG. 8 is a plan view of strips used in making the grip according to the subject disclosure.
Figure 10:
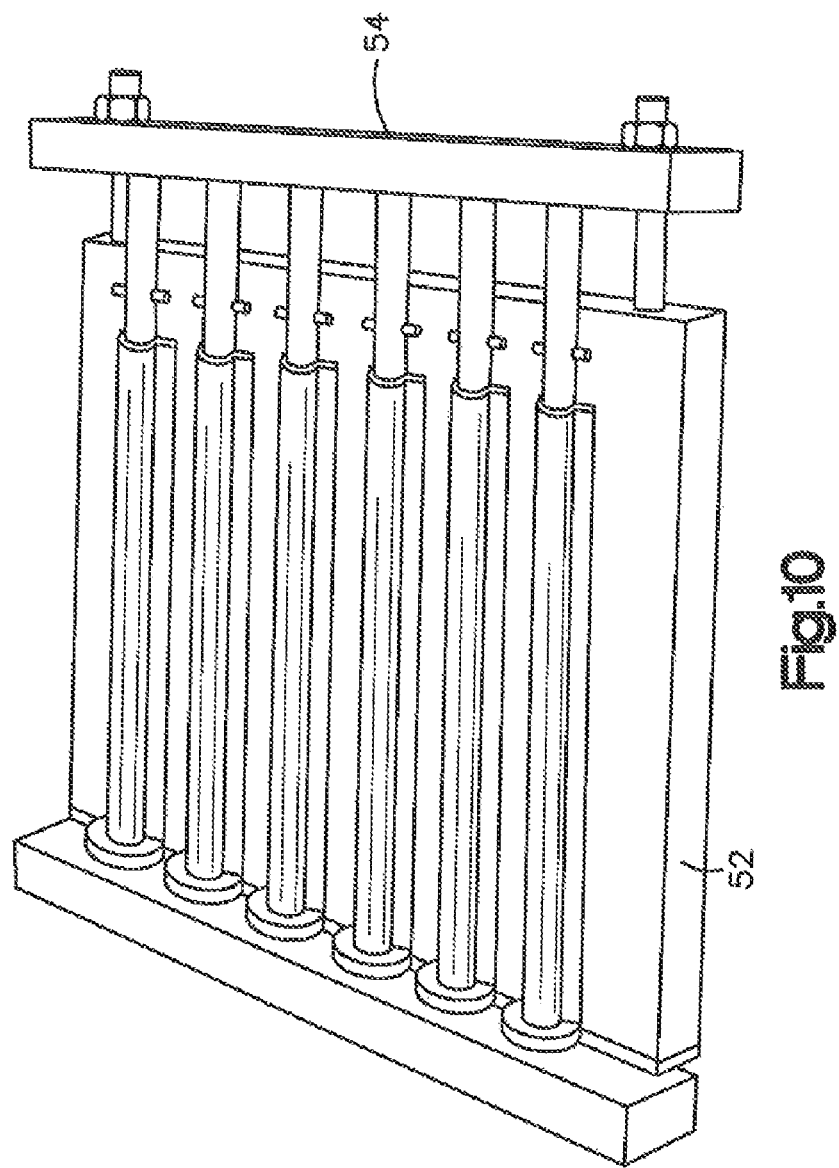
FIG. 10 is an elevated view of a mandrel disposed in the other half of a compression mold according to the present disclosure.

The grip according to the present invention is preferably compression molded using at least three materials with varying specific gravities and hardness in the arrangement previously described. Strips of at least three materials 42, 44, 46 that are made with the desired specific gravities and hardness values are utilized for the upper section 32, middle section 36, and bottom section 40. Strips 42, 44, 46 are positioned in an overlapping relationship fairly end to end in the compression slots 48 in both halves 50, 52 making up the compression mold shown in FIGS. 9 and 10 in a manner that disposes the desired material in the slot 48 of each half mold 50, 52 in an arrangement corresponding to the selected location desired in the finished grip. In order to integrate or fuse the sections together some overlap of the sections is either provided or additional material added for integrating or joining the sections together. A mandrel 54 is positioned in the half mold 52 to facilitate forming the hollow, tubular grip and forming the elastomeric end materials for forming the butt end 12 and tip end 14 in the half molds 50, 52. The compression half molds 50, 52 are clamped together as known in the art and heated to a temperature that vulcanizes and joins the strips together into the tubular form of the finished golf grip 30.

Suitable materials for the strips may include synthetic or natural rubber compounds, thermoplastic material, other elastomers, polyurethane, silicone, or combinations thereof. An example of a suitable rubber compound composition includes on a weight percent basis: 73% polymer; 20% filler; 5% process acid; and 2% curing agent.

Golf club grips according to the embodiments of the present disclosure may be designed for virtually any type of golf club, namely putters and the so-called "swing grips", like irons and woods. The grips are designed according to customer requests for specific types of hardness and the locations for those hardness values as well as the colored visual indicators or alternatively feel indicators. The center of balance of the grip is adjustable as previously described and can be tailored to the customer request.

The foregoing is illustrative of the present disclosure and is not to be construed as limiting thereof. Although a few exemplary embodiments of this disclosure have been described, those skilled in the art will readily appreciate that many modifications are possible in the exemplary embodiments without materially departing from the novel teachings and advantages of this disclosure. Accordingly, all such modifications are intended to be included within the scope of this disclosure as defined in the claims. The disclosure is defined by the following claims, with equivalents of the claims to be included therein.

I claim:

1. A golf club grip with a selected fulcrum position, comprising:

an elongated tubular body having a hollow core constructed to slip on to a golf club shaft, said body further including a butt end at an upper end and an open tip end for receiving the golf club shaft, said body having at least three defined sections with at least three different materials with selected hardness values and specific gravities for providing a selected fulcrum position, an upper section having a specific gravity ranging from approximately 0.8 to approximately 2.0, a middle section, and a bottom section said middle and bottom sections each having a specific gravity ranging, from approximately 0.6 to approximately 1.4, each of said sections having an indicator for readily identifying an area of the section and the hardness value of that section for facilitating hand placement, said upper section having the selected specific gravity being greater than either of said middle and bottom sections to move said selected fulcrum position towards said butt end of the golf club grip to a distance of approximately 0.187 to approximately 0.280 the length of the golf club grip measured from said butt end of the golf club grip.

2. The grip as recited in claim 1, wherein said indicators for each of said sections comprise visual indicators.

3. The grip as recited in claim 1, wherein said indicators for each of said sections are feel indicators.

4. The grip as recited in claim 1, wherein said material in said upper section comprises a hardness value ranging from approximately 60 Shore A to approximately 40 Shore A, and having a specific gravity ranging from approximately 0.8 to approximately 2.0.

5. The grip as recited in claim 4, wherein said material in said middle section comprises a hardness value less than said material in said upper section, said hardness value of said material in said middle section ranging from approximately 55 Shore A to approximately 40 Shore A, and having a specific gravity ranging from approximately 0.6 to approximately 1.4.

6. The grip as recited in claim 5, wherein said material of said bottom section comprises a hardness value different from said material in said upper section and said material in said bottom section having a hardness value ranging from approximately 55 Shore A to approximately 40 Shore A, and a specific gravity ranging from approximately 0.6 to approximately 1.4.

7. A grip for an implement, comprising:

a cylindrical shaped body constructed to slip onto a handle, said body having a hollow core with a butt end at one end and an open end at the other end, said body being molded in a manner that defines at least three distinct sections with three distinct colors and formed with three different materials, an upper section, a middle section and a lower section, said upper section having a specific gravity greater than said middle and lower sections, said sections having different hardness values and specific gravities, each of said sections using the distinct colors as indicators for identifying each of the three sections, said three sections having a predetermined specific gravity for each section for providing a selected region for a fulcrum position for the grip that selectively shifts the fulcrum position of the grip in a desired location towards the butt end of the grip to a distance of approximately 0.187 to approximately 0.280 the length of the grip measured from the butt end of the grip.

8. The grip as recited in claim 7, wherein said grip comprises a golf club grip.

9. The grip as recited in claim 7, wherein said material of said upper section comprises a specific gravity ranging from approximately 0.8 to approximately 2.0, said material of said middle section comprises a specific gravity ranging from approximately 0.6 to approximately 1.4, and said material of said lower section comprises a specific gravity ranging from approximately 0.6 to approximately 1.4, whereby said specific gravity of said upper section being higher than said specific gravities of said middle and lower sections causes a shift in the center of balance position of the grip towards the butt end of the grip.

* * * * *